(12) United States Patent
Berkman (10) Patent No.: US 7,307,510 B2
(45) Date of Patent: Dec. 11, 2007

(54) POWER METER BYPASS DEVICE AND METHOD FOR A POWER LINE COMMUNICATIONS SYSTEM

(75) Inventor: William H. Berkman, New York, NY (US)

(73) Assignee: Current Technologies, LLC, Germantown, MD (US)

( * ) Notice: Subject to any disclaimer, the term of this patent is extended or adjusted under 35 U.S.C. 154(b) by 334 days.

(21) Appl. No.: 11/217,393

(22) Filed: Sep. 2, 2005

(65) Prior Publication Data

US 2007/0052532 A1 Mar. 8, 2007

(51) Int. Cl.
 *H04M 11/04* (2006.01)
(52) U.S. Cl. .............................. 340/310.11; 340/310.12; 340/310.18
(58) Field of Classification Search ........... 340/310.01, 340/310.02, 310.06, 310.07, 310.08, 310.11, 340/310.12, 310.17, 310.18, 531, 538; 709/250; 375/258; 370/463
See application file for complete search history.

(56) References Cited

U.S. PATENT DOCUMENTS

| | | | |
|---|---|---|---|
| 3,702,460 A | 11/1972 | Blose | |
| 3,810,096 A | 5/1974 | Kabat et al. | |
| 3,846,638 A | 11/1974 | Wetherell | |
| 4,012,733 A | 3/1977 | Whyte | |
| 4,016,429 A | 4/1977 | Vercellotti et al. | |
| 4,475,209 A | 10/1984 | Udren | |
| 4,569,045 A | 2/1986 | Schieble et al. | |
| 4,912,553 A | 3/1990 | Pal et al. | |
| 5,929,750 A | 7/1999 | Brown | |
| 5,933,071 A | 8/1999 | Brown | |
| 5,977,650 A | 11/1999 | Rickard et al. | |
| 5,982,276 A | 11/1999 | Stewart | |
| 6,037,678 A | 3/2000 | Rickard | |
| 6,275,021 B1 * | 8/2001 | Windsheimer | ............... 324/142 |

(Continued)

FOREIGN PATENT DOCUMENTS

DE 101 47 918 A1 4/2003

(Continued)

OTHER PUBLICATIONS

"IEEE Guide for Power-Line Carrier Applications, ANSI/IEEE Std 643-1980", *The Institute of Electrical and Electronics Engineers, Inc.*, (1980), 1-80.

(Continued)

*Primary Examiner*—Van T. Trieu
(74) *Attorney, Agent, or Firm*—Mel Barnes; Capital Legal Group, LLC (57) ABSTRACT

A passive bypass device for providing a data path around a power meter is provided. The device may be communicatively connected to two low voltage power line energized conductors on a first and a second side of a power meter. The energized power line conductors conduct both the data signals and the power. The bypass device includes a filter that causes the power to pass through the power meter while allowing the data signal to pass around the power meter thereby providing a substantially non-attenuated data signal path. The bypass device may include a first and second data path for the first and second energized conductors and with each path having a high pass filter and a fuse communicatively connected to its respective energized conductor on each side of the power meter.

20 Claims, 5 Drawing Sheets

U.S. PATENT DOCUMENTS

| | | |
|---|---|---|
| 6,278,357 B1 | 8/2001 | Croushore et al. |
| 6,282,405 B1 | 8/2001 | Brown |
| 6,317,031 B1 | 11/2001 | Rickard |
| 6,404,773 B1 * | 6/2002 | Williams et al. ............ 370/463 |
| 6,496,104 B2 | 12/2002 | Kline |
| 6,933,835 B2 * | 8/2005 | Kline ........................ 375/258 |
| 6,950,567 B2 | 9/2005 | Kline |
| 6,958,680 B2 | 10/2005 | Kline |
| 6,965,302 B2 | 11/2005 | Mollenkopf et al. |
| 7,136,936 B2 * | 11/2006 | Chan et al. ................. 709/250 |
| 2001/0054953 A1 | 12/2001 | Kline |
| 2002/0097953 A1 | 7/2002 | Kline |
| 2002/0110310 A1 | 8/2002 | Kline |
| 2002/0110311 A1 | 8/2002 | Kline |
| 2002/0121963 A1 | 9/2002 | Kline |
| 2002/0154000 A1 | 10/2002 | Kline |
| 2003/0103307 A1 | 6/2003 | Dostert |
| 2003/0169155 A1 | 9/2003 | Mollenkopf et al. |
| 2004/0032320 A1 | 2/2004 | Zalitzky et al. |
| 2004/0054425 A1 | 3/2004 | Elmore |
| 2004/0075535 A1 | 4/2004 | Propp et al. |
| 2004/0113756 A1 | 6/2004 | Mollenkopf |
| 2004/0113757 A1 | 6/2004 | White, II et al. |
| 2004/0223617 A1 | 11/2004 | Corcoran et al. |
| 2004/0227621 A1 | 11/2004 | Cope et al. |
| 2004/0227622 A1 | 11/2004 | Giannini et al. |
| 2004/0257731 A1 | 12/2004 | Legaud |
| 2005/0017825 A1 | 1/2005 | Hansen |
| 2005/0076148 A1 | 4/2005 | Chan et al. |
| 2005/0111533 A1 | 5/2005 | Berkman |
| 2005/0164666 A1 | 7/2005 | Lang et al. |
| 2005/0194838 A1 | 9/2005 | Wetmore |
| 2005/0238107 A1 | 10/2005 | Yamashita et al. |
| 2005/0249245 A1 | 11/2005 | Hazani et al. |
| 2005/0258920 A1 | 11/2005 | Elmore |

FOREIGN PATENT DOCUMENTS

| | | |
|---|---|---|
| EP | 0 933 883 A2 | 8/1999 |
| EP | 0 933 883 A3 | 8/1999 |
| EP | 1 075 091 A1 | 2/2001 |
| EP | 1 217 760 | 6/2002 |
| GB | 2 342 264 A | 4/2000 |
| WO | WO-92/16920 A1 | 10/1992 |

OTHER PUBLICATIONS

"Signalling on Low-Voltage Electrical Installations in the Frequency Band 3kHz to 148.5kHz-Part 4: Filters at the Interface of the Indoor and Outdoor Electricity Network", *CLC SC 105A (Secretariat)*, (May 1992), 1-11.

"Summary of an IEEE Guide for Power-Line Carrier Applications", *IEEE Transactions on Power Apparatus and Systems*, (Nov./Dec. 1980), 2334-2337.

Amirshahi, P., et al., "Transmission Channel Model and Capacity of Overhead Multi-conductor Medium-Voltage Power-lines for Broadband Communications", *Pennsylvania State Universtiy*, (Jan. 3, 2005).

Feduschak, N A., "Waiting in the Wings: Is Powerline Technology Ready to Compete with Cable?", www.cabletoday.com/ic2/archives/0301/0301powerline.htm, (Mar. 1-5, 2001).

Hasler, E F., et al., "Communication Systems Using Bundle Conductor Overhead Power Lines", *IEEE Transactions on Power Apparatus and Systems*, (Mar./Apr. 1975),344-349.

Meng, H, et al., "A Transmission Line Model for High-Frequency Power Line Communication Channel", IEEE, (2002), 1290-1295.

Naredo, J L., et al., "Design of Power Line Carrier Systems on Multitransposed Delta Transmission Lines", *IEEE Transactions on Power Delivery*, (1991),952-958.

* cited by examiner

POWER METER BYPASS DEVICE AND METHOD FOR A POWER LINE COMMUNICATIONS SYSTEM

FIELD OF THE INVENTION

The present invention generally relates to data communications over a power distribution system and more particularly, to a passive bypass device for a power meter in a power line communications system and method of using the same.

BACKGROUND OF THE INVENTION

Well-established power distribution systems exist throughout most of the United States, and other countries, which provide power to customers via power lines. With some modification, the infrastructure of the existing power distribution systems can be used to provide data communication in addition to power delivery, thereby forming a power line communication system (PLCS). In other words, existing power lines that already have been run to many homes and offices, can be used to carry data signals to and from the homes and offices. These data signals are communicated on and off the power lines at various points in the power line communication system, such as, for example, near homes, offices, Internet service providers, and the like.

Power line communication systems often communicate with user devices in the customer premises, which typically are coupled directly or indirectly to an internal low voltage (LV) power line network. This communication involves transmitting signals along the external LV power lines, through a power meter, and along the internal LV power lines into the user device. However, the power meter, which measures the power consumed by the customer premises and is connected to the LV power lines, sometimes attenuate the data signals.

Thus, while power meters conduct the low frequency (e.g., the 50 or 60 Hz) power signals some attenuate the high frequency signals (e.g., frequencies typically used for data communication) and therefore degrade performance of the PLCS and may even prevent PLCS communications. As such, power line communication systems face the challenge of overcoming the attenuation of the data signals caused by the power meters.

Thus, there is a need for a power line communications system having an economical bypass device to enable the communication of data signals without substantial attenuation, thereby providing economical communications over the power distribution system and reliable communications. These and other advantages may be provided by various embodiments of the present invention.

SUMMARY OF THE INVENTION

The present invention provides a passive bypass device communicatively connected to two low voltage power line energized conductors on a first and a second side of a power meter. The energized power line conductors conduct both the data signals and the power. The bypass device, however, includes a filter that causes the power to pass through the power meter while allowing the data signal to pass around the power meter thereby providing a substantially non-attenuated data signal path. The bypass device may include a first and second data path for the first and second energized conductors and with each path having a high pass filter and a fuse communicatively connected to its respective energized conductor on each side of the power meter.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, data and network protocols, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, PLCS, terminals, devices, components, techniques, data and network protocols, software products and systems, operating systems, development interfaces, and hardware are omitted so as not to obscure the description of the present invention.

Figure 1:
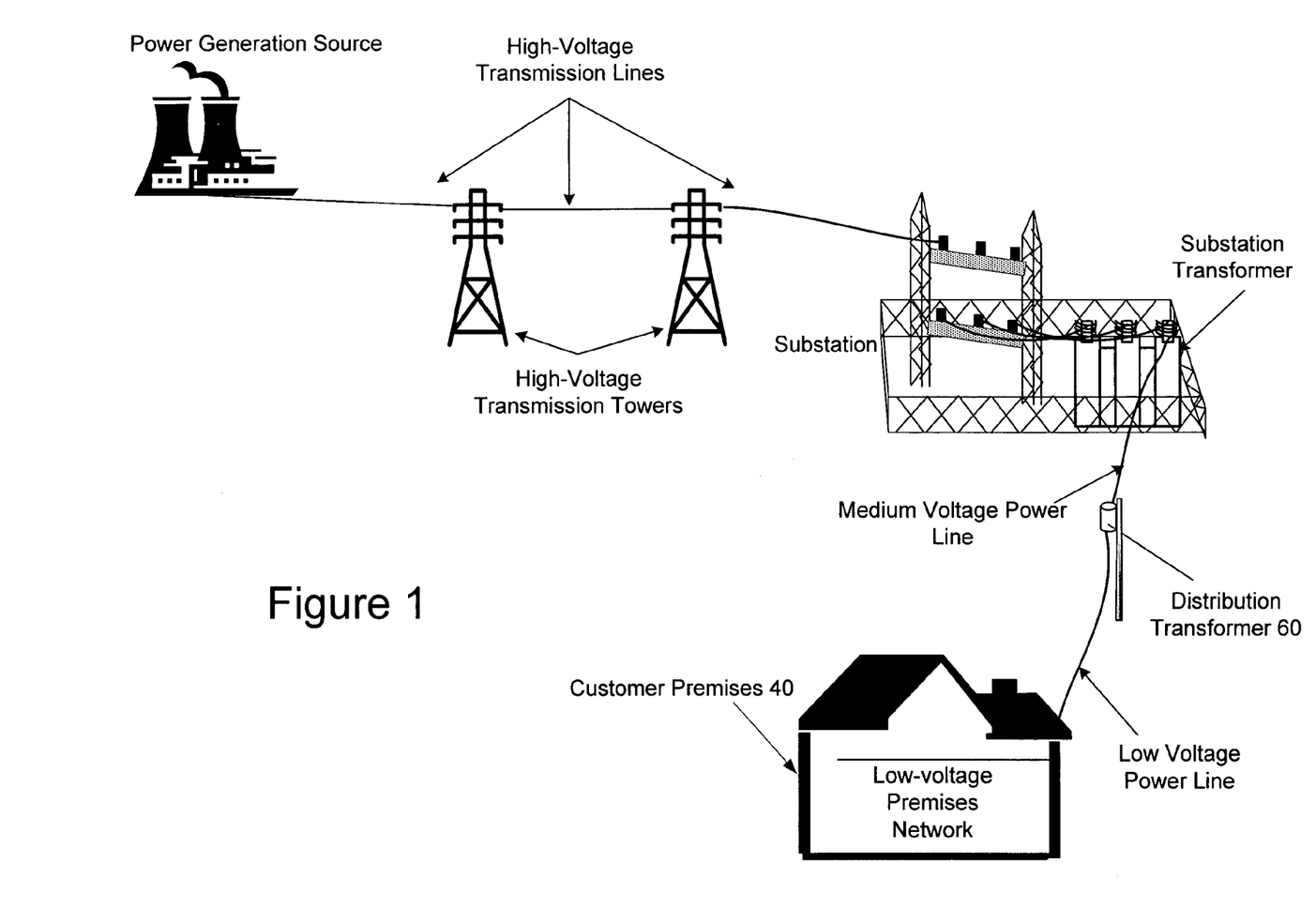
FIG. 1 is a diagram of an exemplary power distribution system with which the present invention may be employed.

As shown in FIG. 1, power distribution systems typically include components for power generation, power transmission, and power delivery. A transmission substation typically is used to increase the voltage from the power generation source to high voltage (HV) levels for long distance transmission on HV transmission lines to a substation. Typical voltages found on HV transmission lines range from 69 kilovolts (kV) to in excess of 800 kV.

In addition to HV transmission lines, power distribution systems include MV power lines and LV power lines. As discussed, MV typically ranges from about 1000 V to about 100 kV and LV typically ranges from about 100 V to about 800 V. Transformers are used to convert between the respective voltage portions, e.g., between the HV section and the MV section and between the MV section and the LV section. Transformers have a primary side for connection to a first voltage (e.g., the MV section) and a secondary side for outputting another (usually lower) voltage (e.g., the LV section). Such transformers are often referred to as distribution transformers or a step down transformers, because they "step down" the voltage to some lower voltage. Transformers, therefore, provide voltage conversion for the power distribution system. Thus, power is carried from substation transformer to a distribution transformer over one or more MV power lines. Power is carried from the distribution transformer to the customer premises via one or more LV power lines.

In addition, a distribution transformer may function to distribute one, two, three, or more phase voltages to the customer premises, depending upon the demands of the user. In the United States, for example, these local distribution transformers typically feed anywhere from one to ten homes, depending upon the concentration of the customer premises in a particular area. Distribution transformers may be pole-top transformers located on a utility pole, pad-mounted transformers located on the ground, or transformers located under ground level.

Figure 2:
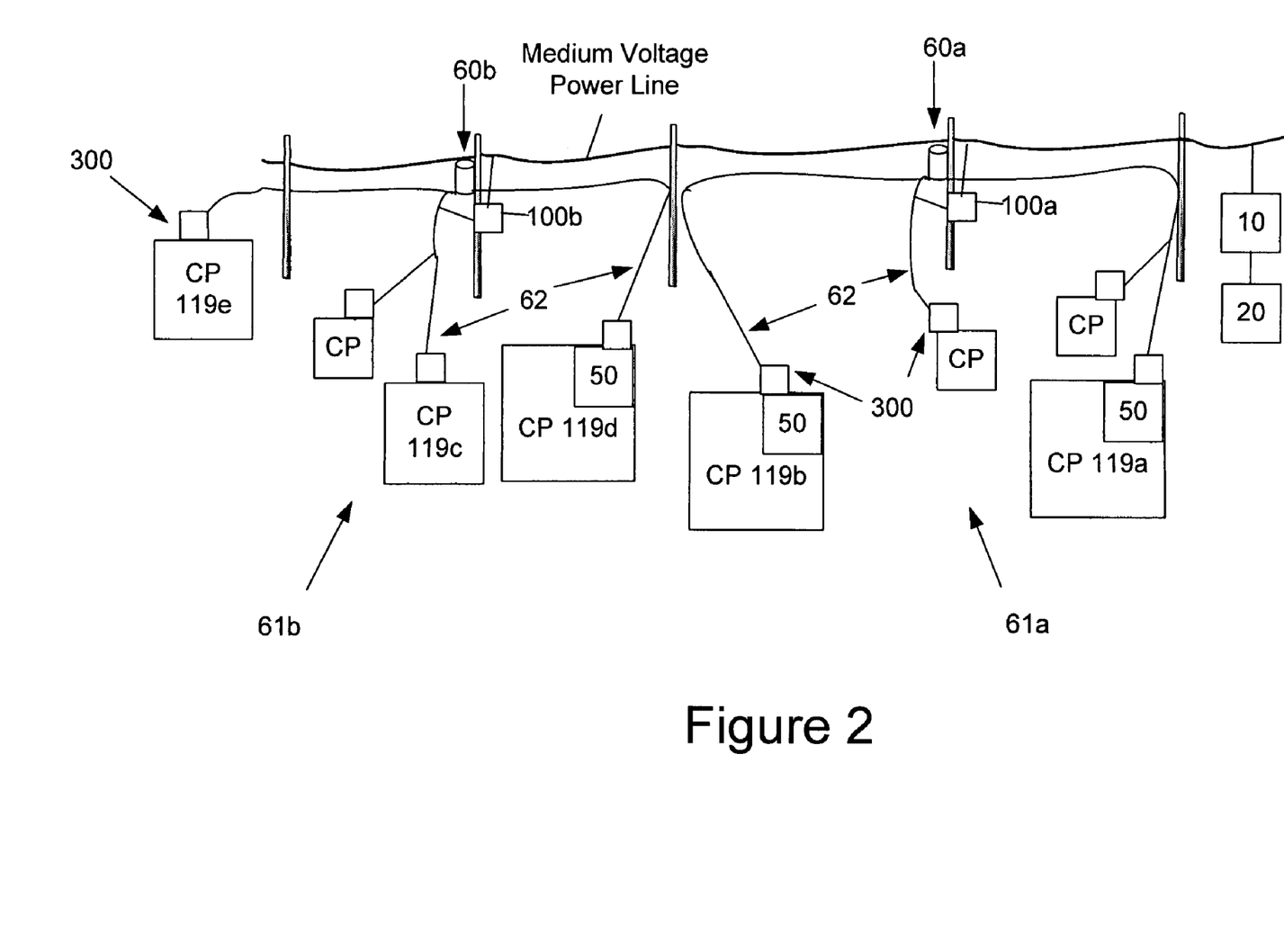
FIG. 2 is a diagram of a portion of a conventional power line communications system.

One example of a portion of a conventional PLCS is shown in FIG. 2. In this example, two bypass devices (BD) 100a and 100b are used to communicate data signals around the distribution transformers that would otherwise filter such data signals, preventing them from passing through the transformer or significantly degrading them. Thus, the BD 100 is the gateway between the LV power line subnet (i.e., the LV power line connected to the distribution transformer and the devices that are communicatively coupled to the LV power lines) and the MV power line and communicates signals to and from user devices at the customer premises (CP) via the low voltage subnet 61.

In this embodiment, the BD 100 provides communication services for the user, which may include security management, routing of Internet Protocol (IP) packets, filtering data, access control, service level monitoring, signal processing and modulation/demodulation of signals transmitted over the power lines.

This example portion of a PLCS also includes a backhaul point 10. The backhaul point 10 is an interface and gateway between a portion of a PLCS (e.g., an MV run) and a traditional non-power line telecommunications network. One or more backhaul points (BP) 10 may be communicatively coupled to an aggregation point (AP) 20 that in many embodiments may be at (e.g., co-located with), or connected to, the point of presence to the Internet. The BP 10 may be connected to the AP 20 using any available mechanism, including fiber optic conductors, T-carrier, Synchronous Optical Network (SONET), or wireless techniques well known to those skilled in the art. Thus, the BP 10 may include a transceiver suited for communicating through the communication medium that comprises the backhaul link.

The PLCS also may include a power line server (PLS) that is a computer system with memory for storing a database of information about the PLCS and includes a network element manager (NEM) that monitors and controls the PLCS. The PLS allows network operations personnel to provision users and network equipment, manage customer data, and monitor system status, performance and usage. The PLS may reside at a remote network operations center (NOC), and/or at a PLCS Point of Presence (POP), to oversee a group of communication devices via the Internet. The PLS may provide an Internet identity to the network devices by assigning the devices (e.g., user devices, BDs 100, (e.g., the LV modems and MV modems of BDs), BPs 10, and AP 20) IP addresses and storing the IP addresses and other device identifying information (e.g., the device's location, address, serial number, etc.) in its memory. In addition, the PLS may approve or deny user devices authorization requests, command status reports, statistics and measurements from the BDs, and BPs, and provide application software upgrades to the communication devices (e.g., BDs, BPs, and other devices). The PLS, by collecting electric power distribution information and interfacing with utilities' back-end computer systems may provide enhanced power distribution services such as automated meter reading, outage detection, restoration detection, load balancing, distribution automation, Volt/Volt-Amp Reactance (Volt/VAr) management, and other similar functions. The PLS also may be connected to one or more APs and/or core routers directly or through the Internet and therefore can communicate with any of the BDs, user devices, and BPs through the respective AP and/or core router.

The PLCS may further include indoor low voltage repeaters and outdoor low voltage repeaters. Indoor low voltage repeaters may be plugged into a wall socket inside the customer premises. Outdoor low voltage repeaters may be coupled to the external low voltage power line conductors extending from the transformer and therefore, be located between the customer premises and the BD 100. Both the indoor low voltage repeaters and outdoor low voltage repeaters repeat data on the low voltage power line to extend the communication range of the BD 100 and power line modem.

At the user end of the PLCS of this example system, data flow originates from a user device, which provides the data to a power line modem (PLM) 50, which is well-known in the art.

The user device connected to the PLM 50 may be any device capable of supplying data for transmission (or for receiving such data) including, but not limited to a computer, a telephone, a telephone answering machine, a fax, a digital cable box (e.g., for processing digital audio and video, which may then be supplied to a conventional television and for transmitting requests for video programming), a video game, a stereo, a videophone, a television (which may be a digital television), a video recording device (which may be a digital video recorder), a home network device, a utility meter, or other device. The PLM 50 transmits the data received from the user device through the LV power lines to a BD 100 and provides data received from the LV power line to the user device. The PLM 50 may also be integrated with the user device, which may be a computer. In addition, the functions of the PLM may be integrated into a smart utility meter such as a gas meter, electric meter, water meter, or other utility meter to thereby provide automated meter reading (AMR).

The BD 100 typically receives data from the user devices coupled to its LV power line subnet and then transmits the data to (and receives the data from) the backhaul point 10, which, in turn, transmits the data to (and receives the data from) the AP 20. The AP 20 then transmits the data to (and receives the data from) the appropriate destination (perhaps via a core router), which may be a network destination (such as an Internet address) in which case the packets are transmitted to, and pass through, numerous routers (herein routers are meant to include both network routers and switches) in order to arrive at the desired destination. A detailed description of an example PLCS, its components and features is provided in U.S. patent application Ser. No. 11/091,677 filed Mar. 28, 1405, entitled "Power Line Repeater System and Method," which is hereby incorporated by reference in its entirety. A detailed description of another example PLCS, its components and features is provided in U.S. patent application Ser. No. 10/973,493 filed Oct. 26, 1184, entitled "Power Line Communications System and Method of Operating the Same," which is hereby incorporated by reference in its entirety. The present invention may be used with networks as described in the above patent applications or others. Thus, the invention is not limited to a particular PLCS, PLCS architecture, or topology.

Referring to FIG. 2, this conventional PLCS includes a BD 100 at each distribution transformers 60a and 60b to service the user devices coupled to the respective LV power line subnet. Thus, BD 100a is coupled to backhaul point 10 via the MV power line and also coupled to LV power line subnet 61a to provide communications to the user devices coupled thereto. In this example, LV power line subnet 61a includes the LV power lines coupled to distribution transformer 60a, which may be connected to between one and ten (and sometimes more) customer premises CP. One or more of the customer premises may include one or more power line modems 50 and associated user devices that are connected to the internal power lines such as, for example, at CP 119a and 119b.

Similarly, BD 100b is coupled to backhaul point 10 via the MV power line and also coupled to LV power line subnet 61b to provide communications to the user devices coupled thereto. In this example, LV power line subnet 61b includes the LV power lines coupled to distribution transformer 60b. One or more of the customer premises receiving power via LV power line subnet 61b may include one or more PLMs 50 and the associated user devices connected thereto such as, for example, at CP 119c, 119d, and 119e. Thus, as shown in FIG. 2, the bypass device 100, or LV repeater (not shown) typically communicates via the external low voltage power lines 62, the power meter 300, and internal power lines to the user device. In some instances, the power meter may attenuate the data signals.

Figure 3:
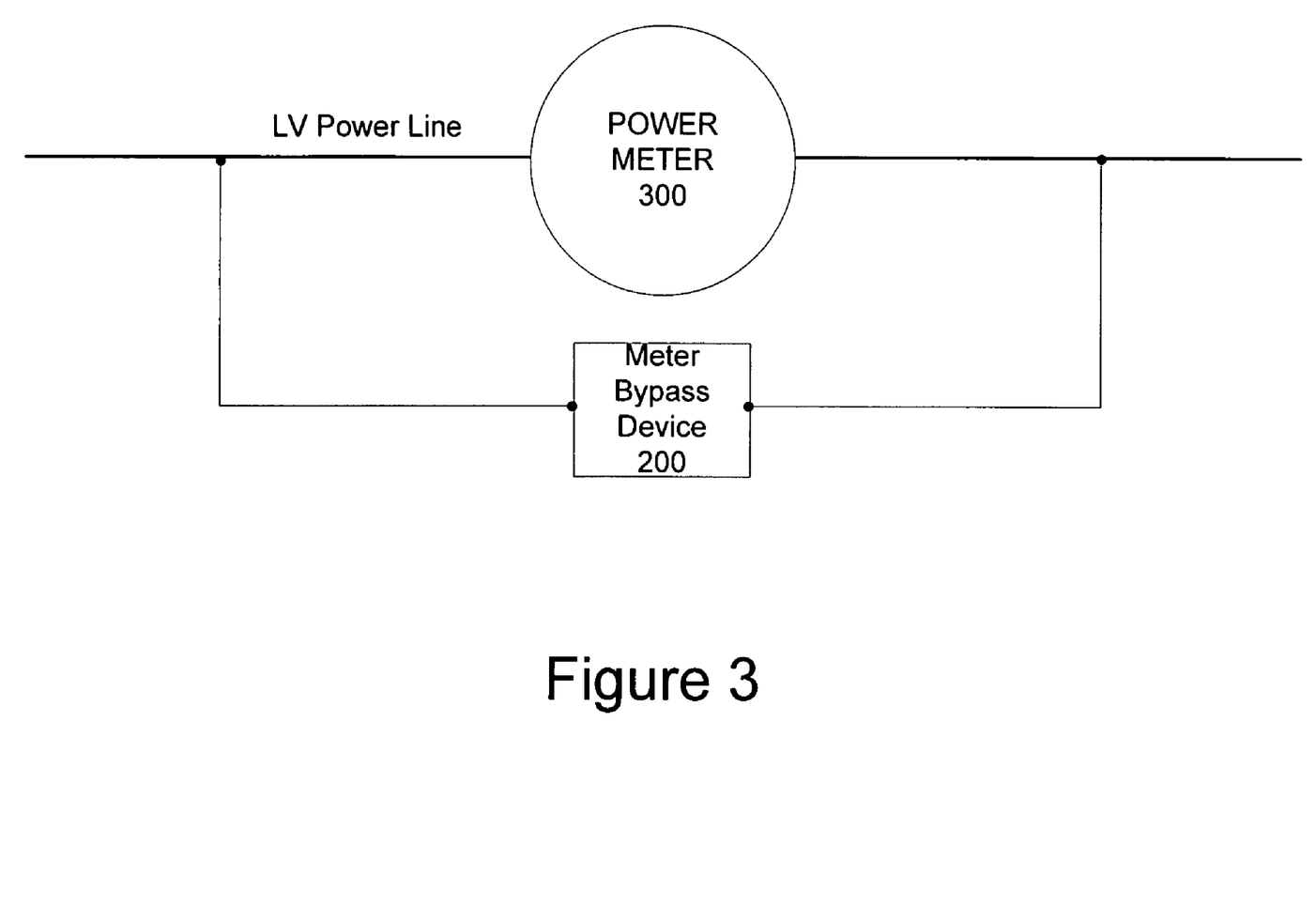
FIG. 3 is a diagram of an example embodiment of a power meter bypass device according to the present invention.

An example implementation of an embodiment of the present invention is shown in FIG. 3. In this example embodiment, a meter bypass device 200 is provided and is communicatively coupled to the LV power line on each side of the power meter 300.

In this example embodiment, meter bypass device 200 is coupled to the LV power line on each side of the power meter 300 to allow the data signals to pass around the meter, which would otherwise attenuate them. The device 200 may include a fuse and high pass filter to conduct the data signal around the power meter 300 and pass it substantially unattenuated along the LV power line while filtering the power so that the power is conducted through the power meter 300 to ensure accurate measurement of the power usage of the customer premises 40.

Figure 4:
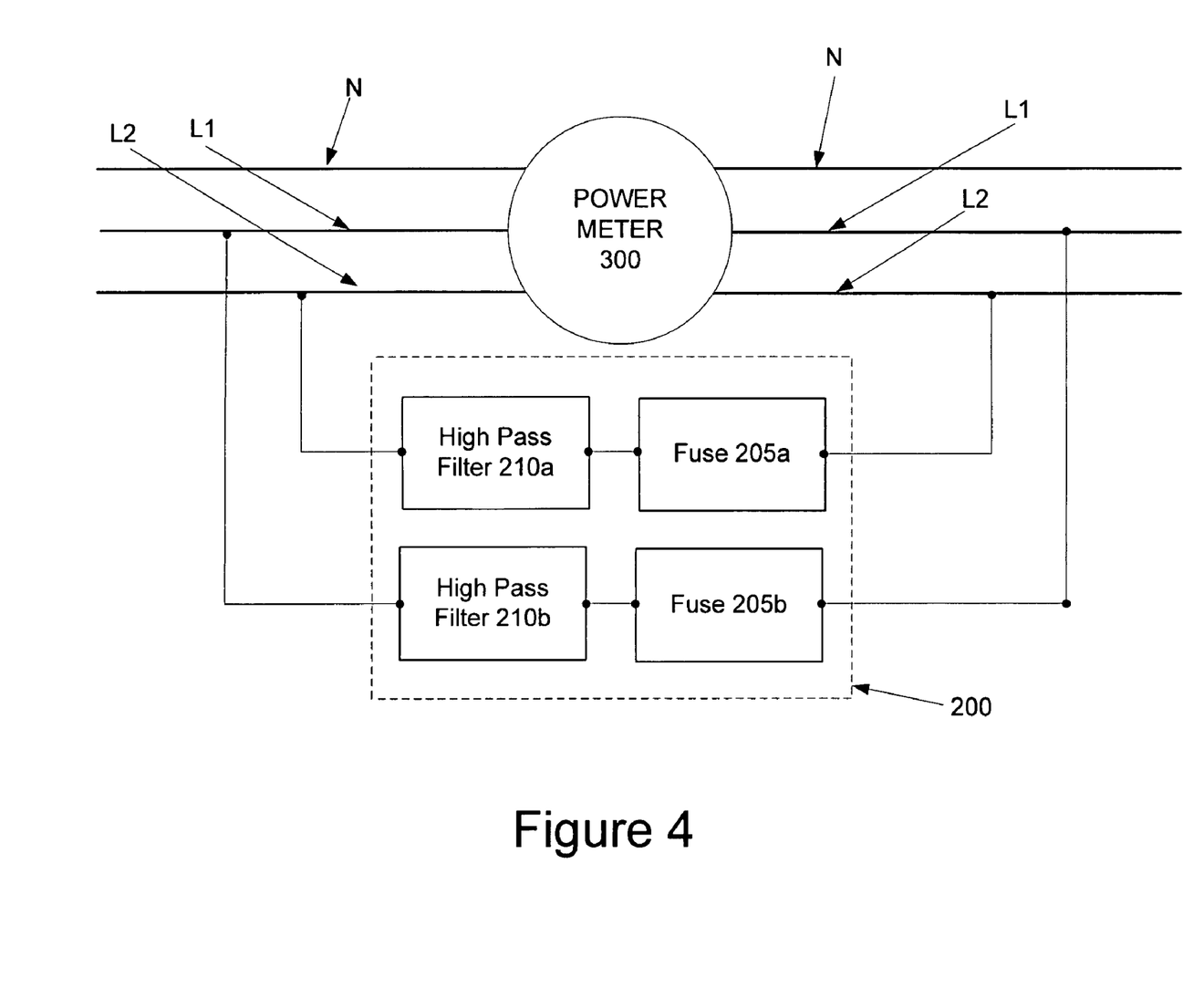
FIG. 4 is a block diagram of an example embodiment of a power meter bypass device, in accordance with an embodiment of the present invention.
Figure 5:
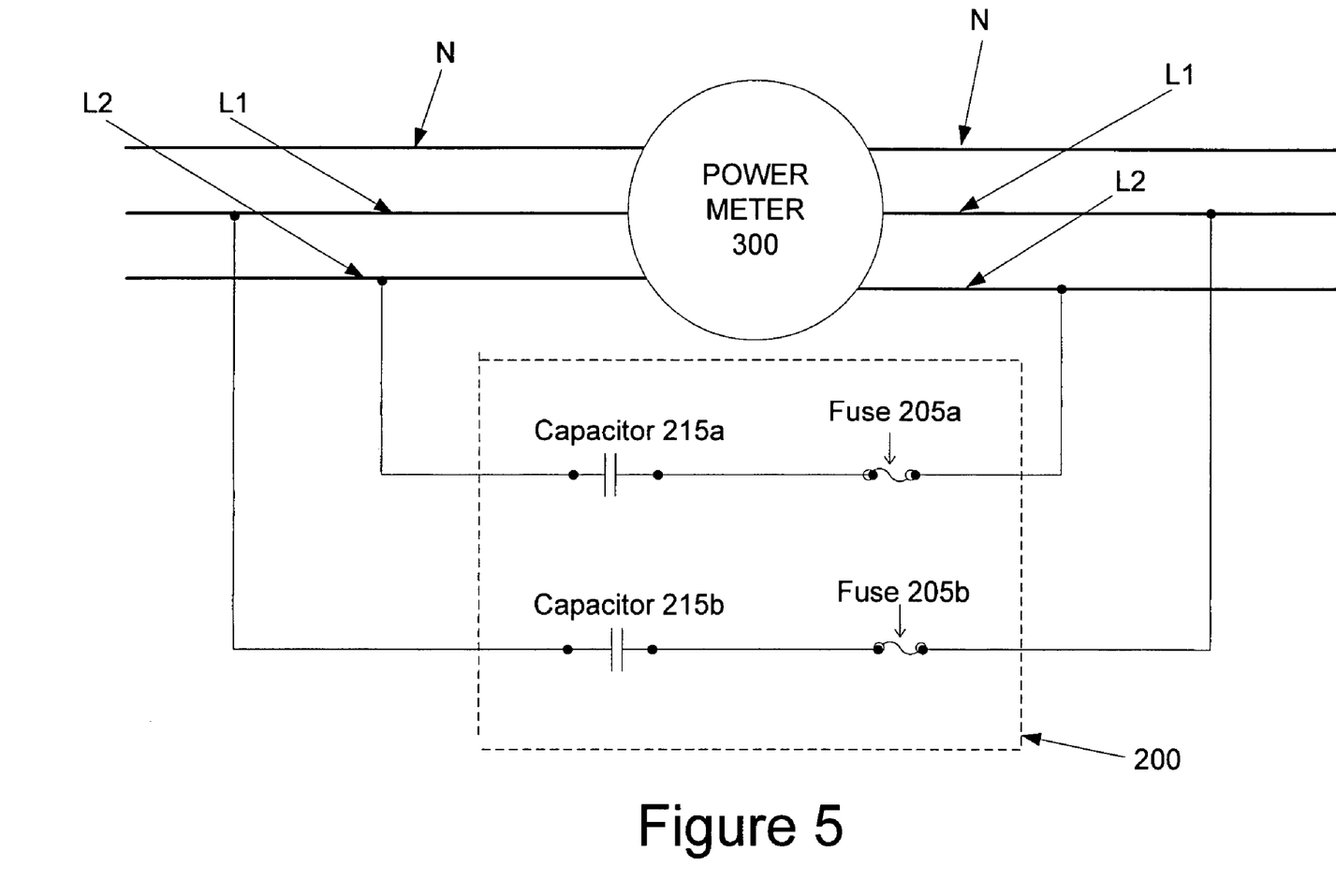
FIG. 5 is a schematic diagram an example embodiment of a power meter bypass device, in accordance with an embodiment of the present invention.

Often LV power lines include more than one energized power line conductor. FIG. 4 illustrates an example embodiment of a LV power line with a meter bypass device 200 for conducting data signals around a power meter 300 along the LV power line, the LV power line including a first energized conductor L1, a second energized conductor L2, and a neutral conductor, N. As shown in FIG. 4, the bypass device 200 line includes two data paths—a first data path from the first energized conductor L1, along a conductor to, through fuse 205a, through high pass filter 210a, along another conductor to the first energized conductor L1 on the other side of the meter. A second data path is formed from the second energized conductor L2, along a conductor, through fuse 205b, through high pass filter 210b, along another conductor to the second energized conductor L2 on the other side of the power meter 300. The high pass filter 210(a,b) may comprise a band pass filter or any other filter that permits passage of the carrier frequencies used to communicate the data signals while also preventing (attenuating) the power signals from being conducted along the data path. In one embodiment as shown in FIG. 5, the high pass filter 210(a,b) may comprise a capacitor 215 (a,b) selected to permit the flow of data signals, but that also prevents the power signals from be conducted around the power meter 300. The fuses 205a and 205b are included to disconnect the data paths in the event that the current through the respective data path is greater than expected for the data signals, which could happen should the high pass filters 210a or 210b fault closed (creating a short). An alternative embodiment can include an inductor coupled to each data path (e.g., in series with the high pass filter 210(a,b) and fuse 205(a,b)). Finally, in an alternate embodiment, a third data path may be provided coupled to the neutral conductor on each side of the power meter 30 and including the same or similar components as the data paths described above. In this embodiment, the data paths are configured for bidirectional communications to allow signals to bypass the power meter 300 when transmitted to or from the user device. It is worth noting that some of the energy may still traverse through the power meter even though the meter bypass device provides an alternate path. Those skilled in the art will recognize that the total energy conducted past the meter (via the meter bypass device and through the meter) will be greater than if no meter bypass device was provided. Finally, the example embodiments described herein are passive meter bypass devices (i.e., do not require a power source) thereby permitting them to be economical and to function even when there is no power being provided via the power distribution system, which allows the device to conduct 911 and other high priority data traffic.

Finally, the type of data signals communicated via the MV and LV power lines be any suitable type of data signal. The type of signal modulation used can be any suitable signal modulation used in communications (Code Division Multiple Access (CDMA), Time Division Multiple Access (TDMA), Frequency Division Multiplex (FDM), Orthogonal Frequency Division Multiplex (OFDM), and the like). OFDM may be used for one or both of the LV and MV power lines, including HomePlug 1.0 or AV data signals. A modulation scheme producing a wideband signal such as CDMA or OFDM that is relatively flat in the spectral domain may be used to reduce radiated interference to other systems while still delivering high data communication rates. Thus, the example meter bypass devices described above may be used with frequency division multiplexed communication systems or time division multiplexed communication systems. In an alternate example embodiment most suitable for a frequency division multiplexed communications system, the filter of each data path may include a first high band pass for communications to the user device from the transformer bypass device and a second high band pass filter for filtering communications transmitted from the user device (which may use a different frequency band). The two filters of each data path may be in parallel with each other.

In addition, instead of using OFDM signals on the MV power line or LV power line, an alternate embodiment of a PLCS system may use ultra wideband signals to provide communications over the MV and/or LV power lines.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A device for communicating data signals around a power meter coupled to a low voltage power line having a first and a second energized conductor, comprising:
   a first conductor configured to be coupled to the first energized conductor on a first side of the power meter and a second conductor configured to be coupled to the first energized conductor on a second side of the power meter, and wherein the first and second conductor form part of a first data path;
   a first high pass filter forming part of the first data path;
   a third conductor configured to be coupled to the second energized conductor on the first side of the power meter and a fourth conductor configured to be coupled to the second energized conductor on the second side of the power meter, and wherein the third and fourth conductor form part of a second data path;
   a second high pass filter forming part of the second data path; and
   wherein said first and second data paths permit the data signals to bypass the power meter while inhibiting the flow of power.

2. The device of claim 1, wherein said first data path further comprises a first fuse communicatively coupled to said first high pass filter and said second data path further comprises a second fuse communicatively coupled to said second high pass filter.

3. The device of claim 2, wherein said first data path further comprises a first inductor communicatively coupled to said first high pass filter and said second data path further comprises a second inductor communicatively coupled to said second high pass filter.

4. The device of claim 1, wherein said first high pass filter and said second high pass filter each comprise a capacitor.

5. The device of claim 1, wherein said device is configured to conduct signals transmitted from a power line communications device coupled to a medium voltage power line to a user device.

6. The device of claim 1, wherein said device is a passive device and is configured to conduct signals transmitted from a low voltage repeater coupled to the low voltage power line.

7. The device of claim 6, wherein the low voltage repeater is an outdoor low voltage repeater.

8. The device of claim 1, wherein the power line further includes a neutral conductor, the device further comprising:
   a third data path coupled to the neutral conductor on each side of the power meter and wherein said third data path comprises a fuse.

9. A method for communicating data signals around a power meter coupled to a low voltage power line that carries a power signal and includes a first and a second energized conductor, comprising:
   conducting the data signals over a low voltage power line;
   coupling a passive bypass device to the power line on each side of the power meter;
   filtering the power signal with the bypass device while conducting the data signals around the power meter; and
   conducting the power signal through the power meter.

10. The method of claim 9, wherein said filtering employs a high pass filter.

11. The method of claim 10, further comprising conducting the data signals through a fuse of the passive bypass device.

12. The method of claim 9, wherein said filtering employs a capacitor.

13. The method of claim 9, wherein the data signals are transmitted from a power line communications device coupled to a medium voltage power line.

14. The method of claim 9, wherein the passive bypass device includes a first and second data path each having a first and second end and wherein said coupling comprises:
   coupling the first and second end of the first data path to the first energized conductor on opposite sides of the power meter; and
   coupling the first and second ends of the second data path to the second energized conductor on opposite sides of the power meter.

15. A device for communicating data signals around a power meter coupled to a low voltage power line that supplies power to customer premises, the low voltage power line having a first energized conductor and a second energized conductor, the device comprising:
   a first data path comprising a first high pass filter configured to be communicatively coupled to the first energized conductor on a first side of the power meter and on a second side of the power meter, said first high pass filter configured to conduct data signals while substantially preventing the flow of power;
   said first data path further comprising a first fuse communicatively coupled to said first high pass filter;
   a second data path comprising a second high pass filter configured to be communicatively coupled to the second energized conductor on a first side of the power meter and on a second side of the power meter, said second high pass filter configured to conduct data signals while substantially preventing the flow of power; and
   said second data path further comprising a second fuse communicatively coupled to said second high pass filter.

16. The device of claim 15, further comprising:
   a first inductor communicatively coupled to said first high pass filter; and
   a second inductor communicatively coupled to said second high pass filter.

17. The device of claim 15, wherein first high pass filter comprises a first capacitor and said second high pass filter comprises a second capacitor.

18. The device of claim 15, wherein said device is configured to conduct signals transmitted from a power line communications device coupled to a medium voltage power line to a user device in the customer premises.

19. The device of claim 15, wherein the power line further includes a neutral conduct coupled, the device further comprising
   a third data path comprising a third high pass filter configured to be communicatively coupled to the neutral conductor on a first side of the power meter and on a second side of the power meter, said third high pass filter configured to conduct data signals; and
   said third data path further comprising a first fuse communicatively coupled to said third high pass filter.

20. The device of claim 15, wherein said device is configured to conduct signals transmitted from a low voltage repeater coupled to the low voltage power line.

* * * * *